Feb. 7, 1939.  C. A. ARENS  2,146,412
CABLE CONSTRUCTION
Filed July 12, 1938
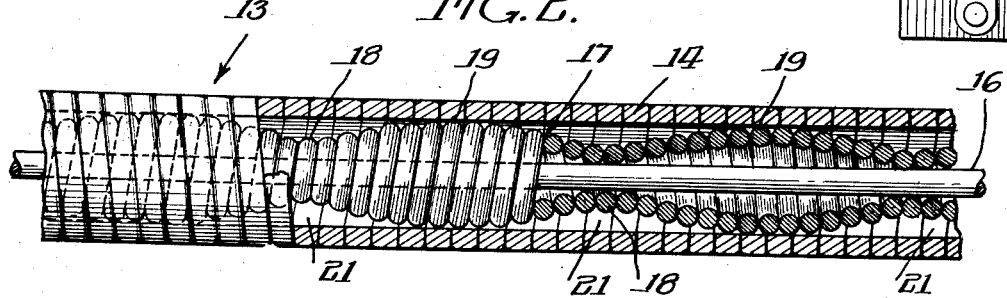
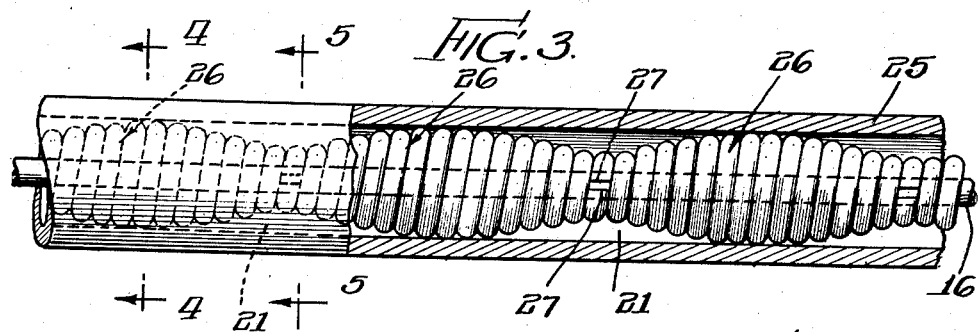
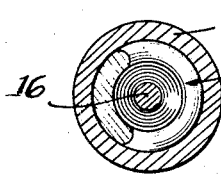
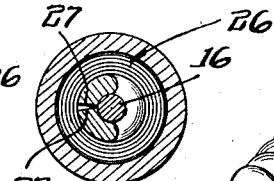
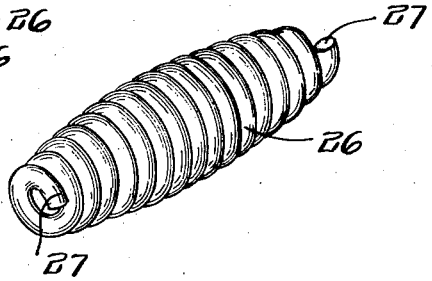
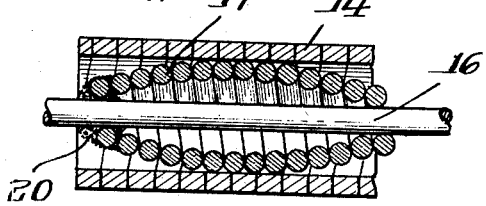
INVENTOR.
Charles A. Arens
BY: Cox & Moore
ATTORNEYS.

Patented Feb. 7, 1939

2,146,412

UNITED STATES PATENT OFFICE 2,146,412

CABLE CONSTRUCTION

Charles A. Arens, Chicago, Ill.

Application July 12, 1938, Serial No. 218,814

8 Claims. (Cl. 74—501)

This invention relates to cable constructions, and particularly to cables of the type adapted to be utilized with control mechanisms to transmit forces from the control handles to the devices to be controlled.

It is an object of the invention to produce a transmission cable of improved construction which can be readily and cheaply fabricated, and which has improved operating characteristics.

More specifically it is an object of the invention to produce a transmission cable having a minimum of frictional resistance between the movable and stationary cable parts whereby to provide a construction which may be operated with a minimum of effort, and which will exhibit no substantial tendency to stick.

A further object is to provide a transmission cable which is in effect self-cleaning as to the contacting surfaces between its stationary and movable parts whereby to preclude jamming or locking of the movable cable elements due to dirt, ice, or other foreign matter.

A still further object of the invention is to provide a transmission cable of the type above defined which may be used either as a rigid or flexible cable construction.

Other objects and advantages of the invention will appear from the following specification when taken in connection with the accompanying drawing, wherein certain preferred embodiments are illustrated.

In the drawing, wherein like reference numerals refer to like parts throughout:

Fig. 1 is a general assembly view illustrating a control mechanism embodying the cable construction of the present invention.

Fig. 2 is a longitudinal sectional view through the cable illustrating the construction as made in accordance with one preferred form of the invention.

Fig. 3 is a similar view illustrating a modified form of cable.

Figs. 4 and 5 are transverse sectional views taken on the lines 4—4 and 5—5 respectively of Fig. 3.

Fig. 6 is a detail perspective view illustrating one of the coil elements of the Fig. 3 construction.

Fig. 7 is a detail view illustrating the manner of securing the movable cable parts together for movement as a unit within the stationary cable sheath.

This application is a continuation-in-part of my copending application Serial No. 83,668, filed June 5, 1936.

Referring to the drawing, and first to Figs. 1, 2 and 7 thereof, Fig. 1 illustrates a control mechanism having a longitudinally reciprocable control handle 10 adapted to move within a support 11 and to operate a movable device 12 to be controlled. The control handle and the controlled device are connected by an elongated transmission cable generally indicated by the numeral 13 which may be of any suitable length to connect the parts. In the form illustrated in Figs. 1, 2 and 7, the transmission cable is flexible so that it may be bent, if desired. To this end the stationary cable sheath comprises a helically wound wire coil 14 secured at its ends to the support 11 and a bracket 15. Due to its construction, the coil or sheath 14 is adapted to be bent to a limited extent. A wire rod or central core member 16 secured at its ends to the control handle 10 and to the device 12 is arranged for longitudinal reciprocation within the sheath 14. A wire coil 17 embraces the central core 16 and is arranged for longitudinal movement as a unit therewith and for sliding movement within the sheath coil 14. As best shown in Fig. 2, in this instance the wire coil 17 comprises a continuous helically wound wire having its convolutions of gradually increasing and decreasing diameter whereby to produce a series of spaced portions 18 which grip the central core member, and an equal series of spaced portions 19 which are adapted for bearing against the sheath. The convolutions 19 are of slightly smaller diameter than the inner diameter of the sheath 14 so as to permit free sliding movement. The coil 17 may be secured at its ends to the central core wire 16 by any suitable means, so as to be longitudinally slidable as a unit therewith. As illustrated in Fig. 7, suitable securing means may comprise merely a soldered connection 20 between the ends of the wire coil and the core wire. The movable assembly of the transmission cable comprising the wire coil 17 and the central core member 16 may be bent with the sheath 14, but due to the longitudinal incompressibility of the coil 17 and the longitudinal inextensibility of the core member 16, the movable assembly is adapted to transmit the necessary longitudinal forces between the control handle 10 and the device 12.

Due to the conoidal spiraling of the wire coil 17, free spaces 21 are provided at intervals along the transmission cable and only the large convolutions 19 are adapted for engagement with the sheath. In other words, the slidable wire coil 17 engages the sheath only at spaced points. Such engagement materially reduces the frictional resistance between the parts. Both static and kinetic friction are reduced and the movements of the control handle 10 are rendered free and easy. Frequently the control handle must be located at a considerable distance from the device to be controlled, requiring the use of a relatively long transmission cable. If the cable sets up material frictional resistance to movement, free adjustment of the control handle is precluded and it is difficult to accurately position the handle in any given desired location. The spaced bearing surfaces of the present invention materially reduce these frictional forces.

Not only are frictional forces reduced, but the open spaces 21 provide reservoirs for the reception of dirt, ice or other foreign matter. The cable construction is rendered self-cleaning in that foreign matter will be scraped from between the bearing convolutions 19 and the sheath and received within the spaces 21 where it will offer no resistance to movement of the sliding coil. Control mechanisms are frequently used on aircraft and may be subjected to rapid temperature changes, including freezing conditions. Under these circumstances condensation and ice may form within the control cable. If this ice locks or jams the parts from movement, manipulation of the control handle may be prevented at a time when it is most needed and accidents may result. In accordance with the present structure, the sliding surfaces in the cable are kept free and clean of all foreign matter, the construction will not jam and is dependable under all conditions of operation.

In Figs. 3 to 6 inclusive an embodiment of the invention is illustrated which is generally similar to that previously described. However, in this instance the sheath 25 comprises a rigid tube member for use in installations where it is not necessary to bend the cable construction. The central core member 16 is arranged for longitudinal sliding movement within the sheath, as in the embodiment of the invention previously described, but in this instance the wire coil embracing the core and slidable within the sheath comprises a series of individual wire coil members 26 rather than a continuous coil. Each coil member 26 has its convolutions of gradually increasing and decreasing size whereby to produce the open spaces 21 as in the first described embodiment of the invention. The ends 27 of adjacent members are arranged in substantially abutting relation, as best shown in Figs. 3 and 5, so that although the coil members 26 are individual elements, a substantially continuous coil assembly is produced. The construction shown in Figs. 3 to 6 inclusive is otherwise the same as that previously described and functions in the same manner. It is to be understood, however, that the individual and separable coil members 26 may be used with a flexible sheath, if desired. Similarly the continuous coil construction 17 of Fig. 2 may, if desired, be used with a rigid sheath as illustrated in Fig. 3. In any event the fabrication and assembly of the parts may be readily and cheaply carried out.

It is obvious that various changes may be made in the specific embodiments of the invention set forth for purposes of illustration without departing from the spirit thereof. For example, the principles of the invention might be embodied in a construction wherein the movable cable elements are rotatable within the cable sheath. Accordingly the invention is not to be limited to the specific embodiment shown and described for illustrative purposes, but only as indicated in the following claims.

The invention is hereby claimed as follows:

1. A transmission cable for control mechanisms and the like comprising a sheath and a wire coil movable therein, the wire of said coil being of uniform gauge and adjacent convolutions of said wire coil being concentrically disposed but of different diameter whereby to produce spaced points of contact between the coil and the sheath.

2. A transmission cable for control mechanisms and the like comprising a sheath, a central core member, and a wire coil arranged between the sheath and the core member, the wire of said coil being of uniform gauge and said wire coil having concentrically disposed convolutions of different size, the smaller of said convolutions being adapted to embrace the core member, and the larger of said convolutions being adapted to contact the sheath.

3. A transmission cable for control mechanisms and the like comprising a sheath, a central core member, and a wire coil arranged between the sheath and the core member, the wire of said coil being of uniform gauge and said coil having large diameter convolutions at spaced points adapted for contact with the sheath, and a plurality of smaller diameter convolutions between each pair of said first named convolutions adapted to embrace the core and to form a reservoir for the reception of foreign matter, said large diameter and smaller diameter convolutions being concentrically disposed.

4. A transmission cable for control mechanisms and the like comprising a sheath, a central core member, and a wire coil arranged between the sheath and the core, said wire coil having large convolutions at spaced intervals for bearing contact with the sheath, and a plurality of convolutions of progressively decreasing size adjacent said large convolutions, said convolutions of progressively decreasing size being adapted to form a guiding surface for guiding foreign matter away from the bearing surfaces of said large convolutions.

5. A transmission cable for control mechanisms and the like comprising a sheath, and a wire coil slidable therewithin, the convolutions of said wire coil being of progressively increasing and decreasing size whereby to provide a series of spaced bearing surfaces for contact with said sheath.

6. A transmission cable for control mechanisms and the like comprising a sheath, a central core member, and a wire coil arranged between the sheath and the core member, said coil having convolutions of progressively increasing and decreasing size, the larger of said convolutions being adapted to contact the sheath, and the smaller of said convolutions being adapted to embrace the core member.

7. A transmission cable as defined in claim 6 wherein the wire coil is continuous along the length of the cable.

8. A transmission cable as defined in claim 6 wherein the wire coil comprises a series of separable coil members, each of said members having convolutions of progressively increasing and decreasing size.

CHARLES A. ARENS.